W. KELLY.
TRANSMISSION GEAR.
APPLICATION FILED MAR. 4, 1911.

1,039,956.

Patented Oct. 1, 1912.

Witnesses
O. B. Baenziger.
J. C. Spratt.

Inventor
William Kelly
By Parker & Burton
Attorneys

UNITED STATES PATENT OFFICE.

WILLIAM KELLY, OF DETROIT, MICHIGAN.

TRANSMISSION-GEAR.

1,039,956.　　　　　Specification of Letters Patent.　　Patented Oct. 1, 1912.

Application filed March 4, 1911. Serial No. 612,176.

*To all whom it may concern:*

Be it known that I, WILLIAM KELLY, citizen of the United States, residing at Detroit, county of Wayne, State of Michigan, have invented a certain new and useful Improvement in Transmission-Gears, and declare the following to be a full, clear, and exact description of the same, such as will enable others skilled in the art to which it pertains to make and use the same, reference being had to the accompanying drawings, which form a part of this specification.

My invention relates to transmission gear for automobiles, and my improvements have for one object to provide an improved mechanism by which the clutching apparatus is operated.

Figure 1:
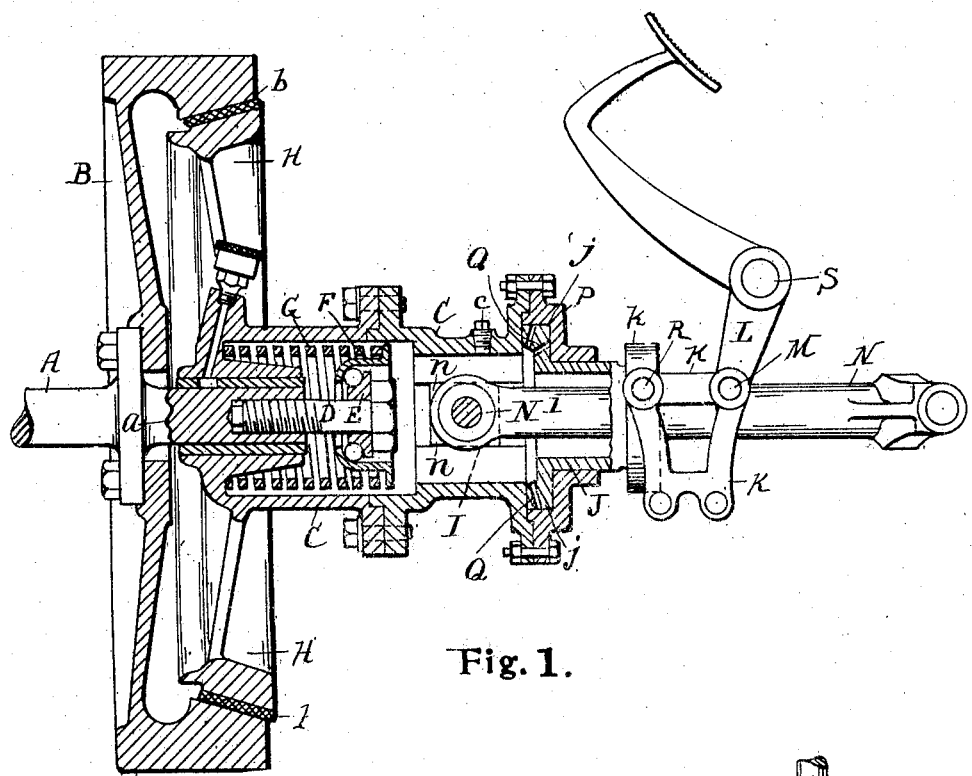
Figure 2:
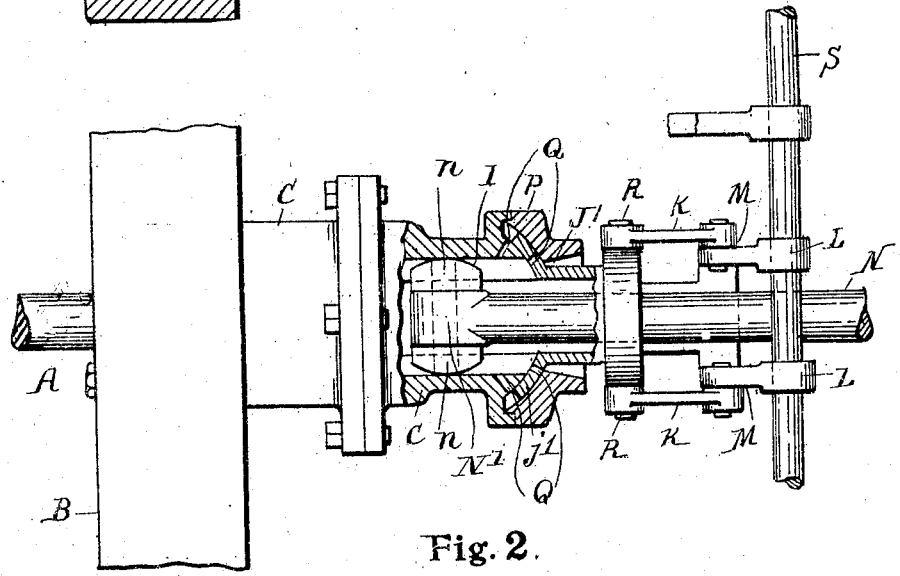

In the accompanying drawing Figure 1 is an elevation mostly, in section, of an apparatus embodying my invention. Fig. 2, is an elevation, partly broken away, of a modified form of embodiment of my invention.

A is the motor shaft and B is a fly wheel thereon.

C is a casing formed at one end to fit upon the extended end A, of the shaft A, so as to turn, and slide longitudinally, relative to the same.

D is a screw-threaded bolt, its threads engaging internal threads in the wall of an aperture extending into the end of the portion A of the shaft, A, coaxial therewith.

E is a cone upon the shank of the bolt D and bearing against the head of the same.

F is a cap having its outer edge formed into an annular flange.

The cone E and cap F, with the balls which are between them, form a thrust bearing.

G is a helical spring having one of its ends bearing against the flange on the cap F, and its other end bearing against the end of the casing.

H is a clutch upon the casing C, adapted to engage against a clutch surface $b$ on the fly-wheel B.

The action of the spring G is to force the casing C toward the left as shown in the figures, and cause the clutch H to engage the surface $b$ on the fly-wheel B, so as to secure the casing C to the shaft A.

N is a transmission shaft extending into the casing C from its end and engaging by a universal joint construction, I, with said casing. Said universal joint construction consists of longitudinal slots in the interior of the walls of the casing C and a cross head $n\ n$ extending into said slots so as to engage the side walls thereof and having curved outer ends as shown in the drawings Fig. 2. The rod N is pivoted to the cross head $n\ n$ at $N^1$.

J is a sleeve surrounding the shaft N where it enters the casing C, and provided with an enlargement $j$ at its inner end in the form of an outwardly extending annular flange.

P is a cap surrounding the sleeve J, extending over and engaging the flange $j$, and securely bolted to the casing C, by bolts engaging the same near the outer edge of said sleeve outside of the flange $j$.

Q Q are radially extending conduits, communicating with the interior of the casing C, and with the outer surface of the flange $j$.

$k$ is a ring upon the outer edge of the sleeve J.

K is a link pivoted at R to the ring $k$.

L is a lever pivoted upon a stationary shaft S, and pivotally connected to the link K at M.

It will be observed that the casing C is hollow and contains the wearing surfaces of the universal joint I, and its interior is connected by outwardly extending conduits Q with the wearing surface of the sleeve J.

In the modification shown in Fig. 2, the flange $j^1$ is made with a surface shaped to a portion of the surface of a sphere, and the part of the casing C engaging this is shaped to it. This forms a ball and socket joint and permits of an angular movement of the shaft N with relation to the casing C, when the sleeve $J^1$ fits tight upon the shaft N.

By manipulating the lever L, the casing may be drawn toward the right as shown in the figures, thus disengaging the clutch H from the fly-wheel.

In practice the casing C is filled with fluid lubricating material through an opening $c$ provided for the purpose, which keeps the joint I lubricated and the lubricant is impelled by centrifugal force through the passages Q, to the contracting surfaces between the sleeve and the cap P or other portion of the casing.

In this construction the wearing parts are inclosed, and provision is made for keeping them continually lubricated.

I claim—

1. Two rotary parts adapted to engage when forced toward each other, and to disengage when separated, a third part extending into one of said two parts and rotatively engaging therein so as to prevent relative longitudinal movement of said third part and the part with which it engages, and means for reciprocating said third part to engage or disengage the other two parts.

2. Two rotary parts adapted to engage when forced toward each other, and disengaged when separated, one of said parts being shaped to form a receptacle for lubricating oil, a third part extending into one of said parts and rotatively engaging therein so as to prevent relative longitudinal movement of said third part and the part with which it engages, means for reciprocating said third part to engage or disengage the other two parts and conduits for lubricating material communicating with said reservoir and with the engaging surface of said third part.

3. Two rotary parts adapted to engage when forced toward each other, and to disengage when separated, one of said parts being adapted to form a reservior for lubricating oil, a third part provided with an enlarged end extending into one of said parts and rotatively engaging therein, so as to prevent relative longitudinal movement of said third part and the part with which it engages, said enlarged end being provided with outwardly extending conduits communicating with said reservoir and with the engaging surface of said third part—and means for reciprocating said third part to engage and disengage said two parts.

4. Two rotary parts adapted to engage when forced toward each other, and to disengage when separated, a shaft extending into one of said parts, a universal joint joining said shaft to said part, a sleeve surrounding said shaft and rotatively engaging in said part, so as to prevent relative longitudinal movement of said third part and the part with which it engages, and means for reciprocating said third part to engage or disengage said two parts.

5. Two rotary parts adapted to engage when forced toward each other, and to disengage when separated, one of said parts being adapted to form a reservoir for the lubricating oil, a shaft extending into one of said parts, a universal joint joining said shaft to said part, a sleeve surrounding said shaft and provided with an enlarged end rotatively engaging in one of said parts, so as to prevent relative longitudinal movement of said third part and the part with which it engages, and an outwardly extending conduit communicating with the interior of said reservoir, and with the engaging surfaces of said part and said sleeve, and means for reciprocating said sleeve.

6. Two rotary parts adapted to engage when forced toward each other, and to disengage when separated, a shaft extending into one of said parts and engaging therein in a universal joint, a sleeve surrounding said shaft and provided with an enlarged end, engaging in one of said parts in a ball and socket joint, and an outwardly extending conduit communicating with the interior of one of said parts and with the engaging surfaces of said sleeve and the part with which it engages and means for reciprocating said sleeve.

In testimony whereof, I sign this specification in the presence of two witnesses.

WILLIAM KELLY.

Witnesses:
VIRGINIA C. SPRATT,
ELLIOTT J. STODDARD.